(12) United States Patent
Yagi et al.

(10) Patent No.: US 6,236,126 B1
(45) Date of Patent: May 22, 2001

(54) BRUSHLESS MOTOR

(75) Inventors: Yoshihiro Yagi; Hiromi Kawarai; Setsuya Uchino, all of Tochigi; Hideki Sunaga, Gunma; Shigenori Ohira, Ibaraki, all of (JP)

(73) Assignee: Calsonic Kansei Corporation, Tokyo (JP)

( * ) Notice: Subject to any disclaimer, the term of this patent is extended or adjusted under 35 U.S.C. 154(b) by 0 days.

(21) Appl. No.: 09/502,019

(22) Filed: Feb. 11, 2000

(30) Foreign Application Priority Data

Jun. 25, 1999 (JP) .................................................. 11-180552

(51) Int. Cl.[7] .............................. H02K 5/04; H02K 5/24
(52) U.S. Cl. ............................... 310/51; 310/89; 310/91; 310/156; 310/261
(58) Field of Search ............................... 310/51, 261, 89, 310/91, 156

(56) References Cited

U.S. PATENT DOCUMENTS

| 4,623,812 | * | 11/1986 | Van De Griend | 310/268 |
| 4,883,982 | * | 11/1989 | Forbes et al. | 310/62 |
| 5,402,024 | * | 3/1995 | Watanabe et al. | 310/156 |
| 5,798,589 | * | 8/1998 | Ohi et al. | 310/90 |

FOREIGN PATENT DOCUMENTS

| 4-109838 | 4/1992 | (JP) | H02K/1/28 |
| 4-168942 | 6/1992 | (JP) | H02K/1/18 |
| 6-205561 | 7/1994 | (JP) | H02K/5/24 |
| 8-009616 | 1/1996 | (JP) | H02K/29/00 |
| 10-191595 | 7/1998 | (JP) | H02K/9/06 |

* cited by examiner

*Primary Examiner*—Burton Mullins
(74) *Attorney, Agent, or Firm*—Foley & Lardner

(57) ABSTRACT

A brushless motor comprises a parts protecting case; a drive shaft rotatable about its axis relative to the parts protecting case; a fixed housing for rotatably holding therein the drive shaft; a stator tightly held by the fixed housing; a shock absorbing unit interposed between the fixed housing and the parts protecting case to suppress transmission of vibration of the fixed housing to the parts protecting case; a yoke connected to the drive shaft to rotate therewith; and a plurality of magnets held by the yoke. The yoke has a vibration damping structure to suppress or at least minimize transmission of vibration of the yoke to the drive shaft.

13 Claims, 10 Drawing Sheets

BRUSHLESS MOTOR

BACKGROUND OF THE INVENTION

1. Field of the Invention

The present invention relates in general to electric motors and more particularly to brushless motors suitable for driving a blower used in an automotive air conditioning device.

2. Description of the Prior Art

In order to clarify the task of the present invention, one conventional brushless motor used for the above-mentioned field will be briefly described.

The brushless motor comprises a driving unit, a drive shaft powered by the driving unit and a parts protecting case. The parts protecting case houses therein the driving unit. The drive shaft projects upward from the case. A blower of the air conditioning device is fixed to the drive shaft. The driving unit comprises a yoke fixed to the drive shaft, a plurality of magnets circumferentially arranged and secured to an inner surface of the yoke having S- and N-poles thereof arranged alternately, a fixed housing for rotatably supporting the drive shaft and a stator mounted to the fixed housing. Upon energization of the driving unit, the yoke and thus the drive shaft is rotated at a high speed relative to the fixed housing.

However, in the brushless motor having the abovementioned structure, it is very difficult to smoothly rotate the drive shaft because of inevitable vibration of the yoke. If, due to the vibration of the yoke, the drive shaft fails to rotate smoothly, the parts protecting case tends to produce a marked noise caused by resonance.

SUMMARY OF THE INVENTION

It is therefore an object of the present invention to provide a brushless motor, which assures a smoothed and noiseless operation.

It is another object of the present invention to provide a brushless motor which is simple, compact and economical.

According to a first aspect of the present invention, there is provided a brushless motor which comprises a parts protecting case; a drive shaft rotatable about its axis relative to the parts protecting case; a fixed housing for rotatably holding therein the drive shaft; a stator tightly held by the fixed housing; a shock absorbing unit interposed between the fixed housing and the parts protecting case to suppress transmission of vibration of the fixed housing to the parts protecting case; a yoke connected to the drive shaft to rotate therewith; a plurality of magnets held by the yoke; and a vibration damping structure provided by the yoke to suppress transmission of vibration of the yoke to the drive shaft.

According to a second aspect of the present invention, there is provided a brushless motor which comprises a parts protecting case; a drive shaft rotatable about its axis relative to the parts protecting case; a fixed housing for rotatable holding herein the drive shaft, the fixed housing having a flange portion; a stator tightly held by the fixed housing; a shock absorbing unit interposed between the flange portion of the fixed housing and an upper side of the parts protecting case to suppress transmission of vibration of the fixed housing to the parts protecting case; a cup-shaped yoke including at least a conical portion, a cylindrical portion and a junction portion through which the conical and cylindrical portions are united, the yoke being connected to the drive shaft to rotate therewith; and a plurality of magnets held by the cylindrical portion of the yoke, wherein the junction portion of the yoke is shaped thin as compared with the conical and cylindrical portions.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 1:
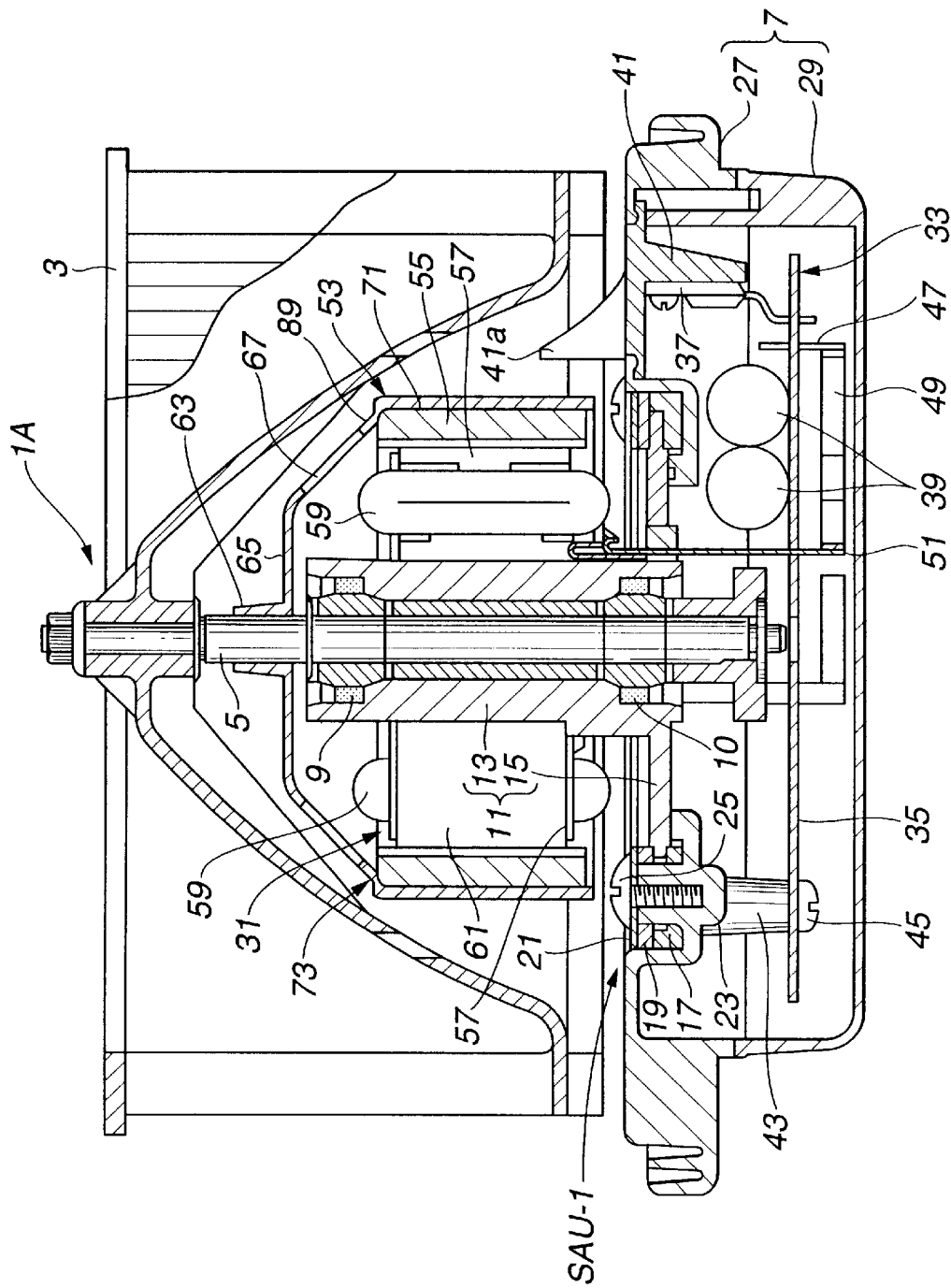
FIG. 1 is a sectional view of a brushless motor which is a first embodiment of the present invention.
Figure 2:
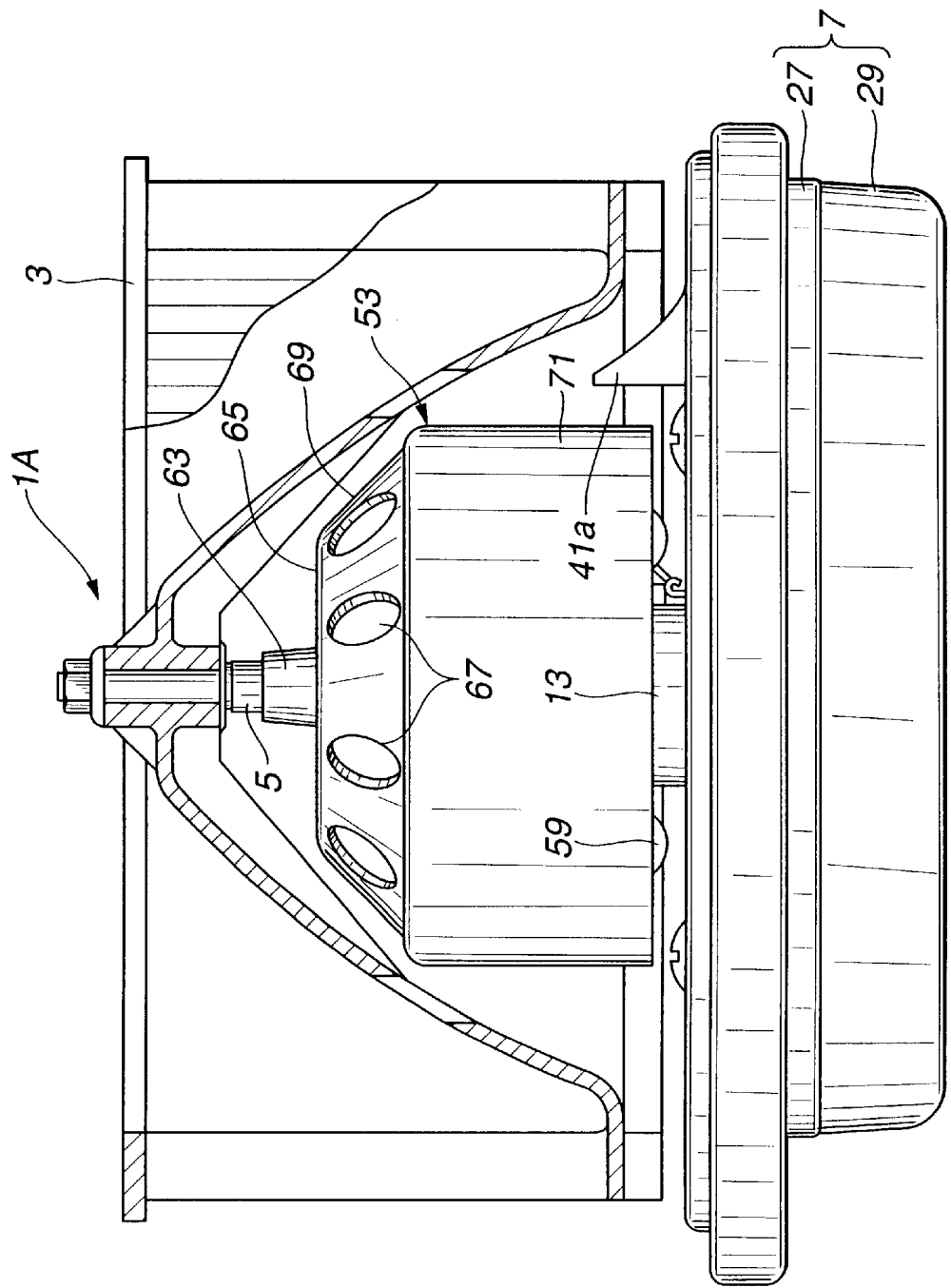
FIG. 2 is a partially sectioned side view of the brushless motor of the first embodiment.
Figure 3:
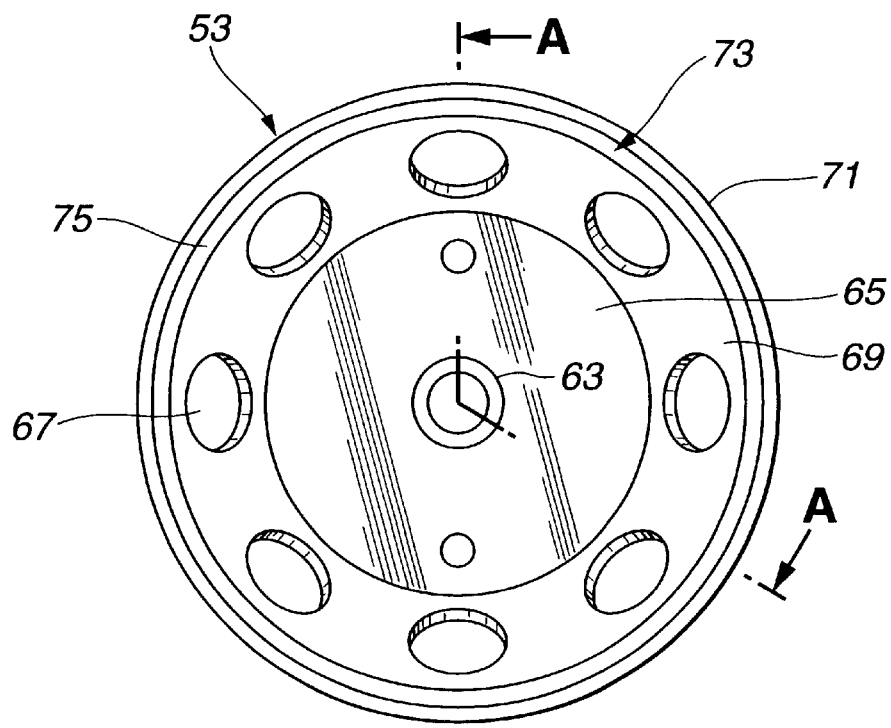
FIG. 3 is a plan view of a yoke employed in the brushless motor of the first embodiment.
Figure 4:
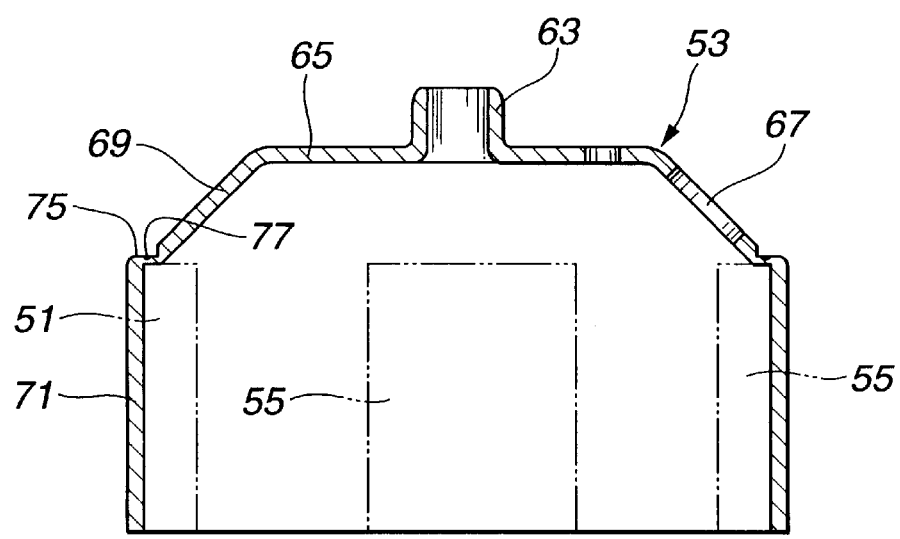
FIG. 4 is a sectional view of the yoke.

In the following, the present invention will be described with reference to the accompanying drawings.

For ease of understanding, the description will be made with the aid of directional terms such as right, left, upper, lower, rightward, etc. However, it is to be noted that such terms are to be understood with respect to the drawing or drawings on which related part and structure are illustrated.

Referring to FIGS. 1 to 8, particularly FIG. 1, there is shown a brushless motor 1A which is a first embodiment of the present invention.

Designated by numeral 3 is a sirocco fan driven by the brushless motor 1A for producing an air flow in an air flow passage defined in the air conditioner. As shown, the sirocco fan 3 has a center portion bolted to a leading end of a drive shaft 5 of the brushless motor 1A.

As is best seen from FIG. 1, the brushless motor 1A comprises an electric parts protecting case 7 from which the drive shaft 5 extends upward. The parts protecting case 7 comprises a lower case member 29 and an upper case member 27 which are detachably coupled to receive therein after-mentioned parts.

The drive shaft 5 is rotatably held by a fixed housing 11 through upper and lower bearings 9 and 10. The fixed housing 11 comprises an upwardly extending cylindrical portion 13 that rotatably holds the drive shaft 5 and a laterally extending mounting flange portion 15. The cylindrical portion 13 projects upward from the parts protecting case 7, while the flange portion 15 is received in the parts protecting case 7, as shown.

For supporting the fixed housing 11, the upper case member 27 of the parts protecting case 7 is formed with a plurality of supporting bosses 23 which are integrally connected through bridge portions. The supporting bosses 23 are projected upward from an annular groove (no numeral) formed in the upper case member 27. Each boss 23 has a threaded bore facing upward. A lower annular elastic member 17 is put in the annular groove having openings (no numerals) thereof received on the bosses 23. The elastic member 17 is made of rubber or the like. A peripheral edge of the flange portion 15 of the fixed housing 11 is supported on the lower annular elastic member 17. An upper annular elastic member 19 made of rubber or the like is put on the peripheral edge portion of the flange portion 15 having openings (no numerals) thereof received on the bosses 23. An annular fixing plate 21 is put on front flat ends of the supporting bosses 23 and secured thereto by means of threaded bolts 25 engaged with the threaded bores of the bosses 23. With this, the flange portion 15 of the fixed housing 11 is resiliently supported by the parts protecting case 7. That is, the lower and upper annular elastic members 17 and 19 constitute a so-called shock absorbing unit "SAU-1".

The driving circuit 33 installed in the parts protecting case 7 functions to control electric current fed to an after-mentioned stator 31. The driving circuit 33 comprises an electric circuit board 35 having a predetermined wiring pattern, a switching element 37 for changing the direction of current fed to the stator 31, electrolytic capacitors 39 and so on. The switching element 37 is secured to an aluminum heat sink 41 through a bolt. The heat sink 41 is secured to the upper case member 27 of the case 7 and formed with heat radiation fins 41a that are projected into the outside of the parts protecting case 7. With the fins 41a, heat generated by the switching element 37 effectively radiates to surrounding air.

The electric circuit board 35 is held, through bolts 45, by bosses 43 that extend downward from the upper case member 27. The above-mentioned driving circuit 33 is connected to the stator 31 through a metal joint bar 47, a metal bus bar 49 and a metal terminal pin 51. As shown, the metal joint bar 47 and the metal terminal pin 51 pass through the electric circuit board 35 and the metal bus bar 49 is positioned below the electric circuit board 35 with its both ends respectively connected to the bar 47 and the pin 51.

The stator 31 comprises a plurality of core units 61 that are concentrically disposed about and secured to the cylindrical portion 13 of the fixed housing 11. Each core unit 61 comprises a coil 59 that is wound around a core proper through an insulator 57.

A yoke 53 is shaped like a cup and arranged to surround the stator 31. The yoke 53 comprises a shaft holding portion 63 secured to the drive shaft 5, a circular flat portion 65 having an inner end integral with a lower end of the shaft holding portion 63, a conical portion 69 having an upper end integral with a periphery of the circular flat portion 65 and a larger cylindrical portion 71 having an upper end integral with a lower end of the conical portion 69. The conical portion 69 is formed with a plurality of equally spaced circular openings 67 (see FIG. 2) through which air is introduced into the interior of the cup-shaped yoke 53.

A plurality of permanent magnets 55 are secured to an inner surface of the larger cylindrical portion 71 of the yoke 53 at equally spaced intervals. These permanent magnets 55 are so arranged that every two magnets 55 located at diametrically opposed positions have their N and S poles facing the same poles. As shown, the group of the permanent magnets 55 is arranged to surround the group of the core units 61 of the stator 31 leaving a small cylindrical space therebetween.

Figure 5:
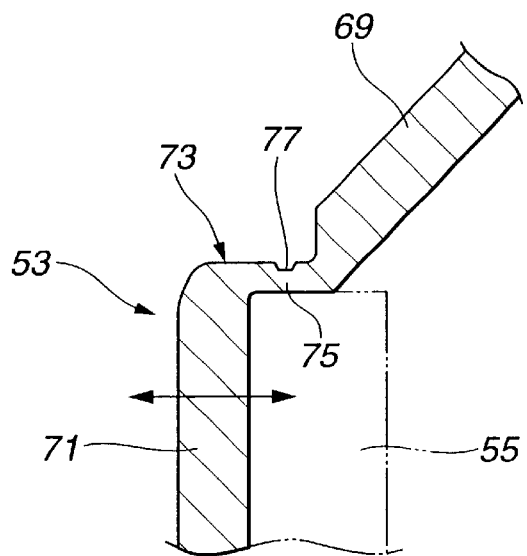
FIG. 5 is an enlarged sectional view of a portion of the yoke where a groove is provided.
Figure 6:
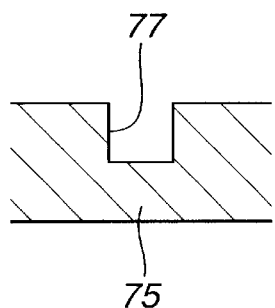
FIG. 6 is an enlarged sectional view of a portion of another yoke wherein a groove is provided.
Figure 7:
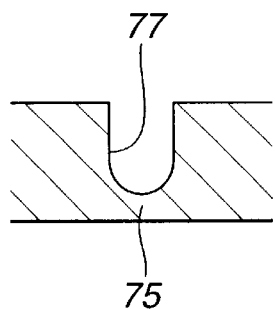
FIG. 7 is an enlarged sectional view of a portion of still another yoke where a groove is provided.

As is best seen from FIG. 5, a junction portion 75 between the conical portion 69 and the cylindrical portion 71 is shaped thin as compared with the other portions 69 and 71, and the thin junction portion 75 is formed with an annular groove 77. The annular groove 77 has a trapezoidal cross section. Under operation of the motor 1A, the grooved thin junction portion 75 serves as a vibration damping means 73. That is, under operation, the grooved thin junction portion 75 serves as a fulcrum of vibration of the cylindrical portion 71.

If desired, the junction portion 75 may comprise a plurality thinner portions leaving thicker portions. Furthermore, if desired, as is seen from FIGS. 6 and 7, the annular groove 77 of the junction portion 75 may have a rectangular cross section or U-shaped cross section.

When, in operation, electric current is forced to flow in the stator 31 changing the flowing direction thereof, S-N, S-S and/or N-N relation is continuously established between the core units 61 and the permanent magnets 55 producing attraction and/or repulsion force therebetween. With this, the cup-shaped yoke 53 is forced to rotate about the stator 31.

Under rotation of the yoke 53, vibration is inevitably produced particularly at the cylindrical portion 71 of the yoke 53. However, due to the fulcrum function possessed by the grooved thin junction portion 75, transmission of the vibration of the cylindrical portion 71 to the shaft holding portion 63 is suppressed or at least minimized. That is, the vibration of the cylindrical portion 71 is damped by the grooved thin junction portion 75. Thus, the drive shaft 5 can rotate smoothly without being affected by the vibration of the cylindrical portion 71. This reduces or minimizes the possibility of undesired resonance of the parts protecting case 7 which would occur when marked vibration is applied to the case 7 from the drive shaft 5.

Figure 8:
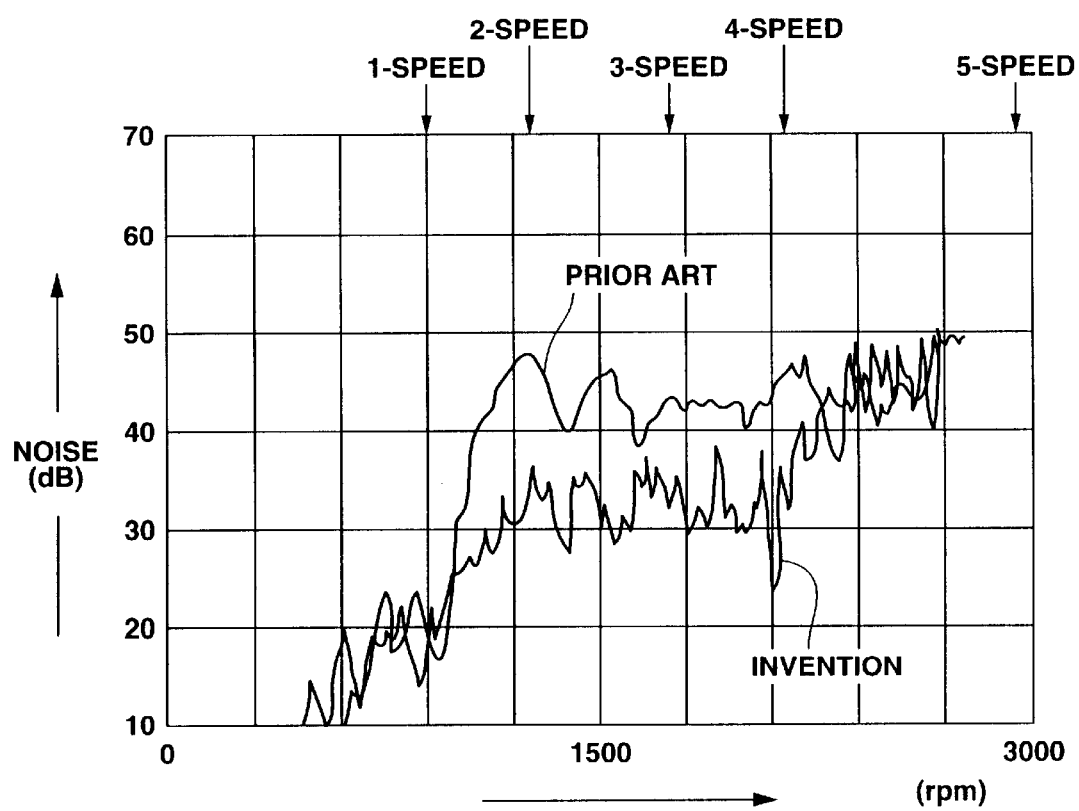
FIG. 8 is a graph showing a noise level or buzzing level produced by the brushless motor of the first embodiment and a conventional brushless motor.

FIG. 8 is a graph depicting a noise or buzzing produced by the brushless motor 1A of the above-mentioned first embodiment. For comparison, the noise or buzzing of a conventional brushless motor is also shown. As is seen from this graph, the brushless motor 1A of the first embodiment shows a lower noise level throughout the service rotation speed (viz., from 900 rpm to 2700 rpm).

Figure 9:
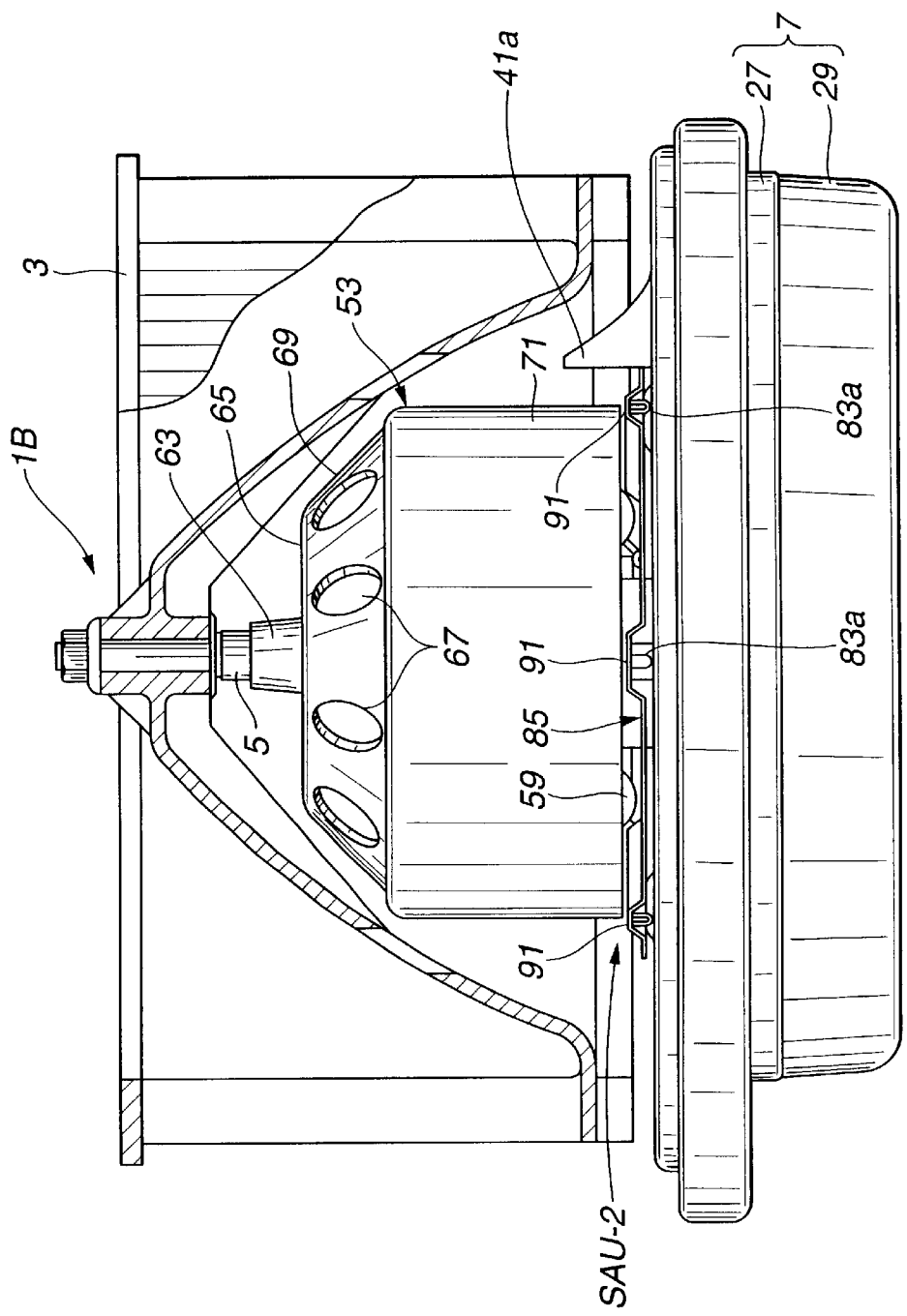
FIG. 9 is a view similar to FIG. 2, but showing a brushless motor of a second embodiment of the present invention.

Referring to FIGS. 9 to 16, particularly FIG. 9, there is shown a brushless motor 1B which is a second embodiment of the present invention.

Since the motor 1B of this second embodiment is similar in construction to the motor 1A of the above-mentioned first embodiment, only part that is different from that of the first embodiment 1A will be described in detail in the following.

Substantially same parts as those of the first embodiment 1A are denoted by the same numerals, and detailed explanation of such same parts will be omitted from the following description.

In the second embodiment 1B, a much improved shock absorbing unit "SAU-2" is used for resiliently supporting the fixed housing 11 (see FIG. 1) on the parts protecting case 7.

Figure 10:
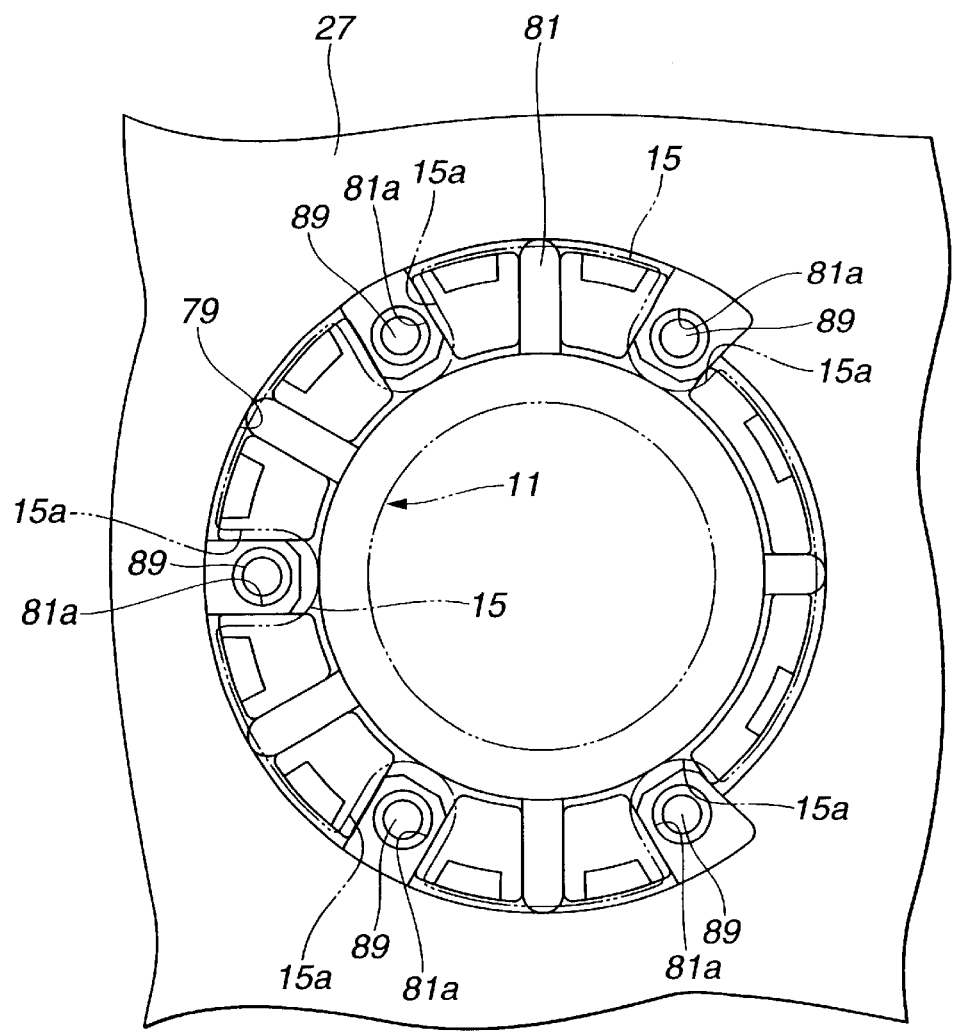
FIG. 10 is a plan view of a lower annular elastic member that is to be fixed to a lower side of a fixed housing.
Figure 11:
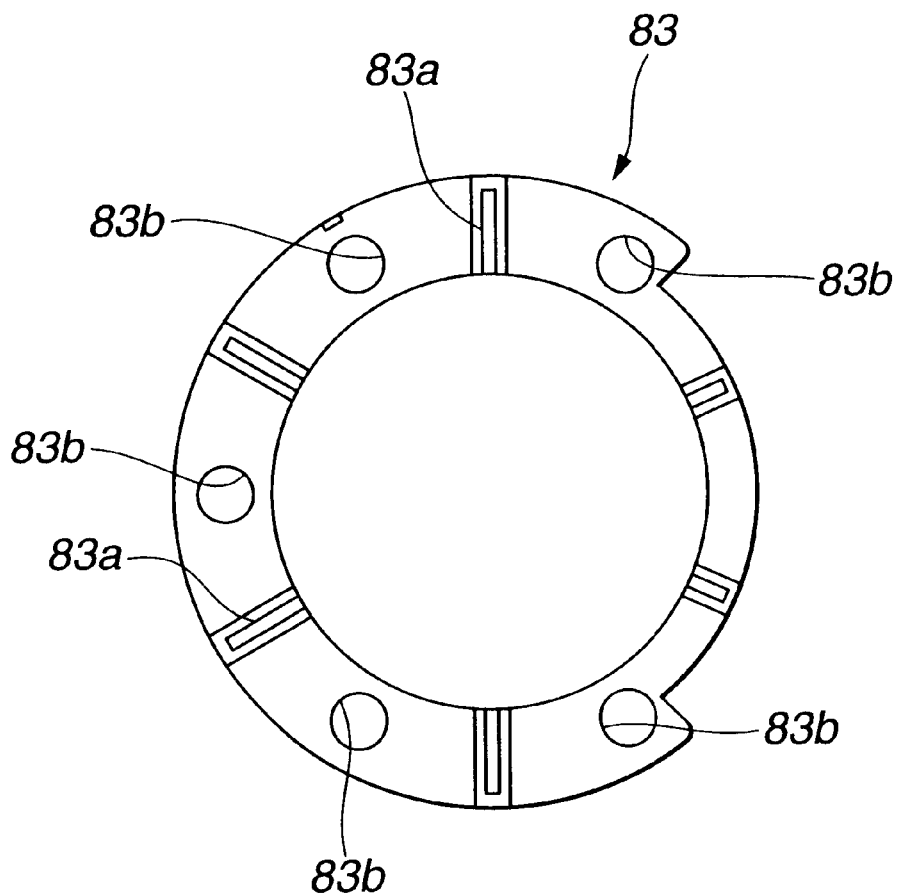
FIG. 11 is a plan view of an upper annular elastic member that is to be set on an upper side of the fixed housing.
Figure 12:
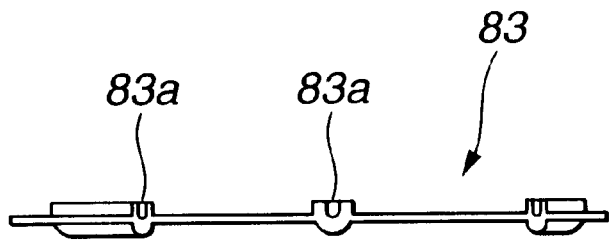
FIG. 12 is a sectional view of the upper annular elastic member.
Figure 13:
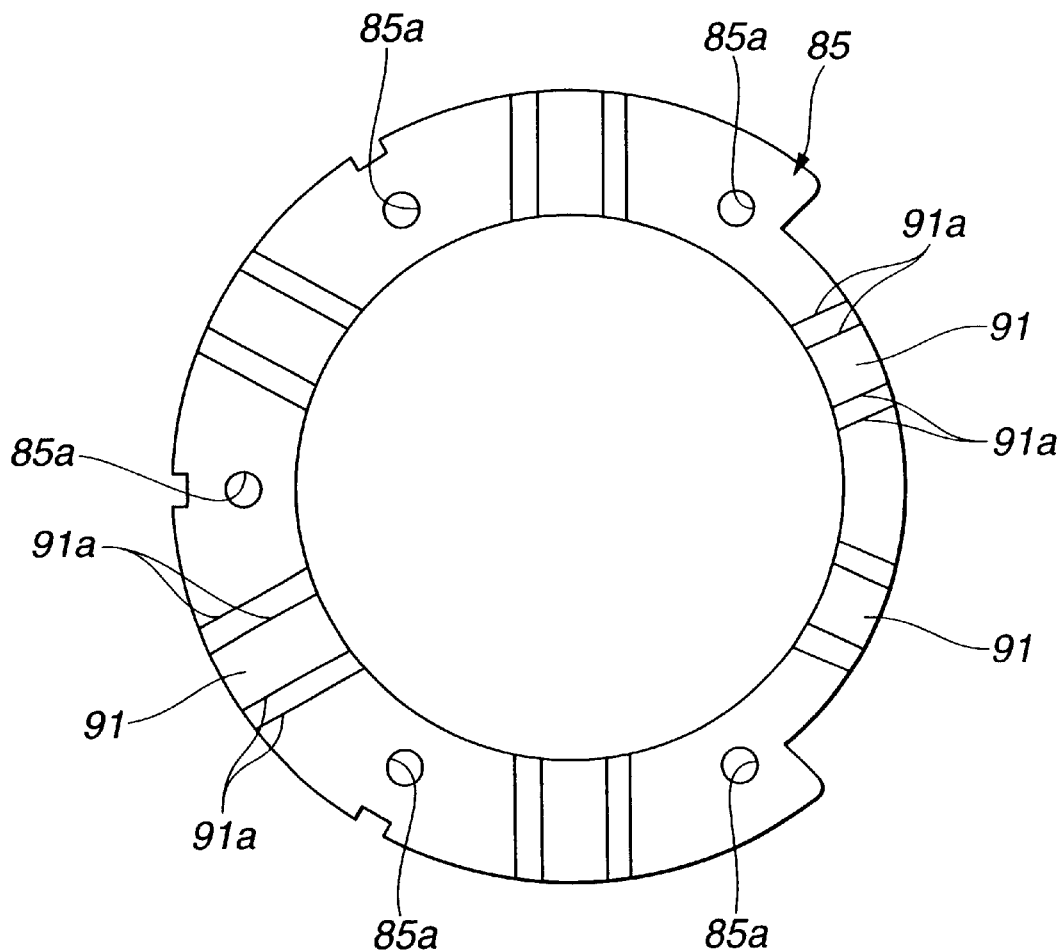
FIG. 13 is a plan view of a fixing plate.
Figure 14:
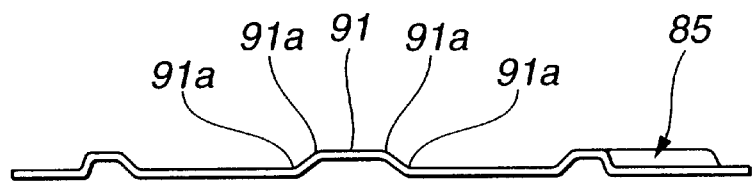
FIG. 14 is a sectional view of the fixing plate.
Figure 15:
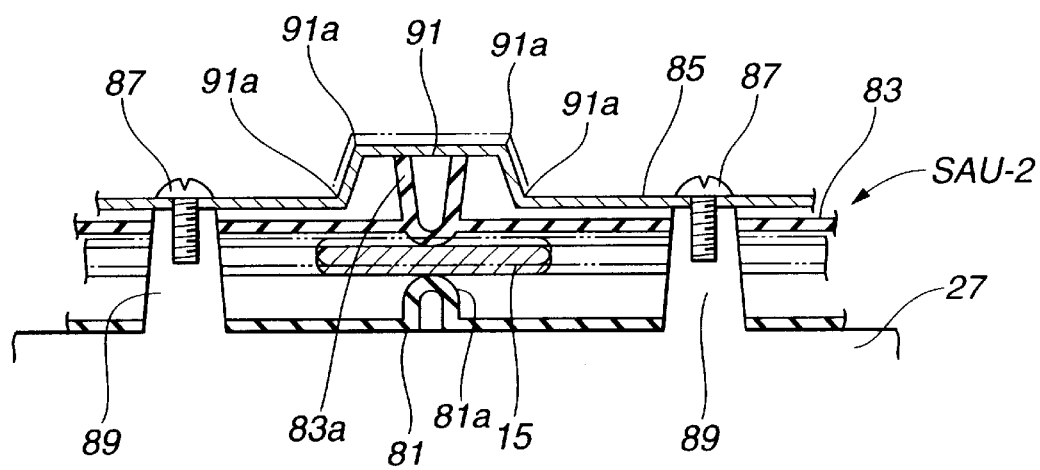
FIG. 15 is a sectional view of an essential portion of the brushless motor of the second embodiment, showing one condition of the fixing plate.

That is, as is seen from FIG. 10 that is a plan view of the upper case member 27 and FIG. 15 that is a sectional view of the upper case member 27 and its associated parts, the upper side of the upper case member 27 is formed with an annular recess 79. A plurality of bosses 89 are projected form a bottom surface of the annular recess 79. In the annular recess 79, there is received a lower annular elastic member 81 of rubber or the like, that has a plurality of openings 81a through which the bosses 89 are projected upward. On the lower annular elastic member 81, there is put a peripheral portion of the mounting flange portion 15 of the fixed housing 11 that has a plurality of cuts 15a through which the bosses 89 are projected upward. On the peripheral portion of the mounting flange portion 15, there is put an upper annular elastic member 83 of rubber or the like, such as one as shown in FIG. 11, that has a plurality of openings 83b through which the bosses 89 are projected upward. On the upper annular elastic member 83, there is put an annular fixing plate 85, such as one as shown in FIG. 13, that has a plurality of small openings 85a to which heads of the bosses 89 are engaged. As is seen from FIG. 15, by bolts 87, the annular fixing plate 85 is secured to the heads of the bosses 89.

Figure 16:
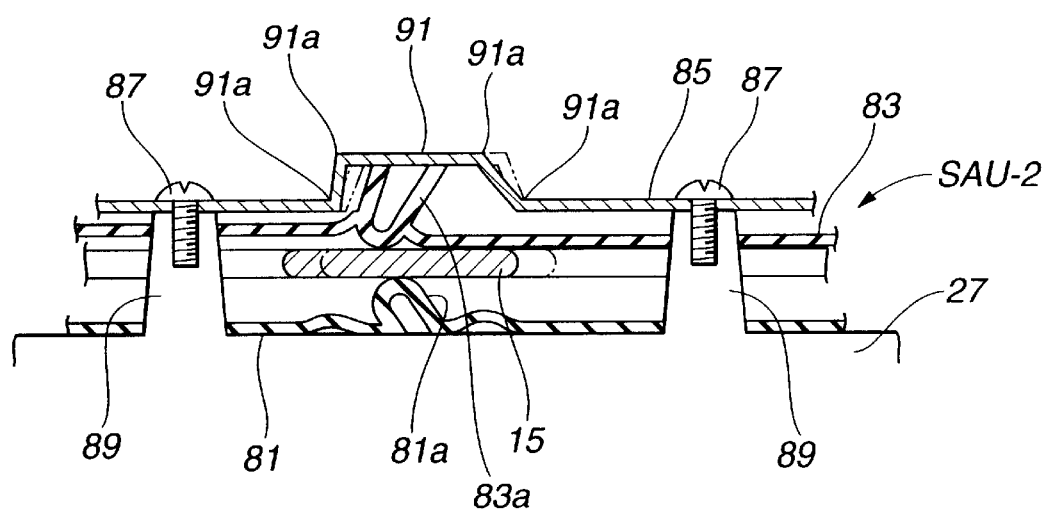
FIG. 16 is a view similar to FIG. 15, but showing another condition of the fixing plate.

In the following, the detail of the shock absorbing unit "SAU-2" will be described with reference to FIGS. 15 and 16.

As is seen from FIG. 15, the lower annular elastic member 81 is formed with a plurality of upward projections 81a on which the mounting flange portion 15 of the fixed housing 11 is seated, and also the upper annular elastic member 83 is formed with a plurality of upward projections 83a each having U-shaped cross section and received in a depressed part 91 of the annular fixing plate 85, as shown. The shape of the upper annular elastic member 83 is well understood from FIGS. 11 and 12. As is seen from FIGS. 13 and 14, each depressed part 91 of the annular fixing plate 85 is provided by bending four portions 91a of the plate 85.

Under rotation of the yoke 53, vibration is inevitably produced that is transmitted to the fixed housing 11. However, due to presence of the above-mentioned improved shock absorbing unit "SAU-2" between the fixed housing 11 and the parts protecting case 7, the vibration of the yoke 53 is damped. That is, for damping such vibration, the projections 81a and 83a of the lower and upper annular elastic members 81 and 83 are resiliently deformed in such a manner as is shown in FIG. 16. Thus, the drive shaft 5 can rotate smoothly without being affected by the vibration of the yoke 53. This reduces or reduces the possibility of undesired resonance of the parts protecting case 7.

If desired, in the second embodiment 1B, the vibration damping means 73 provided on the yoke 53 may be removed.

The entire contents of Japanese Patent Application 11-180552 (filed Jun. 25, 1999) are incorporated herein by reference.

Although the invention has been described above with reference to certain embodiments of the invention, the invention is not limited to such embodiments as described above. Various modifications and variations of such embodiments will occur to those skilled in the art, in light of the above teachings.

What is claimed is:

1. A brushless motor comprising:

a parts protecting case;

a drive shaft rotatable about its axis relative to said parts protecting case;

a fixed housing for rotatably holding therein said drive shaft;

a stator tightly held by said fixed housing;

a shock absorbing unit interposed between said fixed housing and said parts protecting case to suppress transmission of vibration of said fixed housing to said parts protecting case;

a yoke connected to said drive shaft to rotate therewith;

a plurality of magnets held by said yoke; and a vibration damping structure provided by said yoke to suppress transmission of vibration of said yoke to said drive shaft; and wherein said vibration damping structure comprises a thin junction portion possessed by said yoke.

2. A brushless motor as claimed in claim 1, in which said vibration damping structure further comprises a groove defined by said yoke, said groove being positioned at said thin junction portion.

3. A brushless motor comprising:

a parts protecting case;

a drive shaft rotatable about its axis relative to said parts protecting case;

a fixed housing for rotatably holding therein said drive shaft;

a stator tightly held by said fixed housing;

a shock absorbing unit interposed between said fixed housing and said parts protecting case to suppress transmission of vibration of said fixed housing to said parts protecting case;

a yoke connected to said drive shaft to rotate therewith;

a plurality of magnets held by said yoke; and a vibration damping structure provided by said yoke to suppress transmission of vibration of said yoke to said drive shaft;

said yoke being shaped like a cup and comprising;

a shaft holding portion secured to said drive shaft;

a circular flat portion having an inner end integral with a lower end of said shaft holding portion;

a conical portion having an upper end integral with a periphery of the circular flat portion; and a cylindrical portion having an upper end integral with a lower end of said conical portion and wherein:

said vibration damping structure is defined by a junction portion between said conical portion and said cylindrical portion, said junction portion being thinner than said conical and cylindrical portions.

4. A brushless motor as claimed in claim 3, in which said junction portion comprises a plurality of thinner portions leaving thicker portions.

5. A brushless motor as claimed in claim 3, in which the thin junction portion is formed with an annular groove.

6. A brushless motor as claimed in claim 5, in which said annular groove has a trapezoidal cross section.

7. A brushless motor as claimed in claim 5, in which said annular groove has a rectangular cross section.

8. A brushless motor as claimed in claim 5, in which said annular groove has a U-shaped cross section.

9. A brushless motor comprising:

a parts protecting case;

a drive shaft rotatable about its axis relative to said parts protecting case;

a fixed housing for rotatably holding therein said drive shaft;

a stator tightly held by said fixed housing;

a shock absorbing unit interposed between said fixed housing and said parts protecting case to suppress transmission of vibration of said fixed housing to said parts protecting case;

a yoke connected to said drive shaft to rotate therewith;

a plurality of magnets held by said yoke; and a vibration damping structure provided by said yoke to suppress transmission of vibration of said yoke to said drive shaft wherein said shock absorbing unit comprises:

a flange portion of said fixed housing;

an annular groove defined on an upper side of said parts protecting case;

a lower annular elastic member put in said annular groove to put thereon said flange portion;

an upper annular elastic member put on said flange portion;

an annular fixing plate put on said upper annular elastic member; and securing means for securing annular fixing plate, said upper annular elastic member and said lower annular elastic member to said upper side of said parts protecting case; and wherein said lower annular elastic member is formed with a plurality of projections on which said flange portion is seated, and in which said upper annular elastic member is formed with a plurality of projections on which said annular fixing plate is seated.

10. A brushless motor as claimed in claim 9, in which said annular fixing plate is formed with a plurality of depressed portions into which the projections of said upper annular elastic member are projected.

11. A brushless motor comprising:

a parts protecting case;

a drive shaft rotatable about its axis relative to said parts protecting case;

a fixed housing for rotatable holding herein said drive shaft, said fixed housing having a flange portion;

a stator tightly held by said fixed housing;

a shock absorbing unit interposed between the flange portion of said fixed housing and an upper side of said parts protecting case to suppress transmission of vibration of said fixed housing to said parts protecting case;

a cup-shaped yoke including at least a conical portion, a cylindrical portion and a junction portion through which said conical and cylindrical portions are united, said yoke being connected to said drive shaft to rotate therewith; and a plurality of magnets held by said cylindrical portion of the yoke, wherein said junction portion of said yoke is shaped thin as compared with said conical and cylindrical portions.

12. A brushless motor as claimed in claim 11, in which the thinner junction portion is formed with an annular groove.

13. A brushless motor as claimed in claim 11, in which said shock absorbing unit comprises:

an annular groove defined on the upper side of said parts protecting case;

a lower annular elastic member put in said annular groove and having a plurality of projections to put thereon said flange portion of said fixed housing;

an upper annular elastic member put on said flange portion and having a plurality of projections;

an annular fixing plate put on said upper annular elastic member and having a plurality of depressed portions into which the projections of said upper annular elastic member are projected; and securing means for securing said annular fixing plate, said upper annular elastic member and aid lower annular elastic member to the upper side of said parts protecting case.

* * * * *